(12) United States Patent
Shi et al.

(10) Patent No.: US 12,368,775 B2
(45) Date of Patent: Jul. 22, 2025

(54) SCALABLE SERVICE DISCOVERY AND LOAD BALANCING USING DIRECT CLIENT CONNECTIONS TO SERVERS

(71) Applicant: PAYPAL, INC., San Jose, CA (US)

(72) Inventors: Yaping Shi, Saratoga, CA (US); Eric Leu, Cupertino, CA (US); Xuetao Li, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 241 days.

(21) Appl. No.: 18/328,675

(22) Filed: Jun. 2, 2023

(65) Prior Publication Data

US 2024/0406256 A1 Dec. 5, 2024

(51) Int. Cl.
*H04L 67/101* (2022.01)
*H04L 43/10* (2022.01)
*H04L 67/1014* (2022.01)

(52) U.S. Cl.
CPC ............ *H04L 67/101* (2013.01); *H04L 43/10* (2013.01); *H04L 67/1014* (2013.01)

(58) Field of Classification Search
CPC .... H04L 67/101; H04L 43/10; H04L 67/1014
See application file for complete search history.

(56) References Cited

U.S. PATENT DOCUMENTS

| | | | | |
|---|---|---|---|---|
| 9,807,016 B1* | 10/2017 | Sarangapani | ........... | H04L 67/02 |
| 10,193,809 B1* | 1/2019 | Sharma | ................. | H04L 47/125 |
| 10,523,628 B2* | 12/2019 | Goodsitt | ................. | H04L 61/10 |
| 2016/0094513 A1* | 3/2016 | Friedel | ................ | H04L 61/2503 709/245 |
| 2018/0176124 A1* | 6/2018 | Kancherla | ........... | H04L 61/2521 |
| 2020/0252449 A1* | 8/2020 | Wood | ..................... | H04L 67/01 |
| 2021/0160311 A1* | 5/2021 | Han | ..................... | H04L 67/1008 |

OTHER PUBLICATIONS

Shi, Yaping "Scalable Service Discovery and Load Balancing," 8 pages [online], [retrieved on Feb. 9, 2023]. Retrieved from the Internet: <URL:https://engineering.paypal.com/confluence/display/JUNO/Scalable+Service+Discovery+and+Load+Balancing>.

* cited by examiner

*Primary Examiner* — Michael A Keller
*Assistant Examiner* — Thao D Duong
(74) *Attorney, Agent, or Firm* — Haynes and Boone, LLP

(57) ABSTRACT

There are provided systems and methods for scalable service discover and load balancing using direct client connections to servers. A service provider, such as an electronic transaction processor for digital transactions, may provide different computing services to users through client devices, which utilize server instances from server pools and the like to provide the computing services to users. This may include providing servers to handle client requests and process data with users. When client devices connect to the service provider's system, service discovery may be performed to find an available server instance to handle client requests. To provide scalable service discovery, load balancers may, instead of managing client requests through the load balancers, ping server instances from a server pool to identify a network address of an available server. This may be returned to the client device and a direction connection may be made between the device and server.

20 Claims, 5 Drawing Sheets

SCALABLE SERVICE DISCOVERY AND LOAD BALANCING USING DIRECT CLIENT CONNECTIONS TO SERVERS

TECHNICAL FIELD

The present application generally relates to computing service discovery on connection to server systems, and more particularly to load balancers and load balancing operations that provide direct client connections to servers for scalable service discovery.

BACKGROUND

Online service providers may offer various computing services to end users, merchants, and other entities. This may include electronic transaction processing through computing operations, data flows, decision services, and other computing resources that are provided through server clusters and pools that serve client devices. Further, the service provider may provide and/or facilitate the use of online merchant marketplaces and/or transaction processing between different entities. When providing these computing services, the service provider may provide server-side discovery of available server instances for a server cluster or pool used to serve and process client requests.

In today's computing systems and architectures, the server-side discovery may utilize load balancers to present a virtual Internet protocol (IP) address or the like to the client devices and forward the connection to one of the server instances. In this architecture, the client code does not provide and/or perform service discovery. This results in requests and responses between client devices and server passing through the load balancers, which causes issues in performance, scalability, and availability of load balancers. These deficiencies cause issues in scalability of loading balancing and service discovery as the system encounters performance issues when handling many requests and/or requests with large data requirements and loads. As such, it is desirable to provide load balancers that provide improved scalability by handling larger volumes or numbers of client requests with less processing power, computing resource usage, and/or required bandwidth for passing requests and responses.

Figure 1:
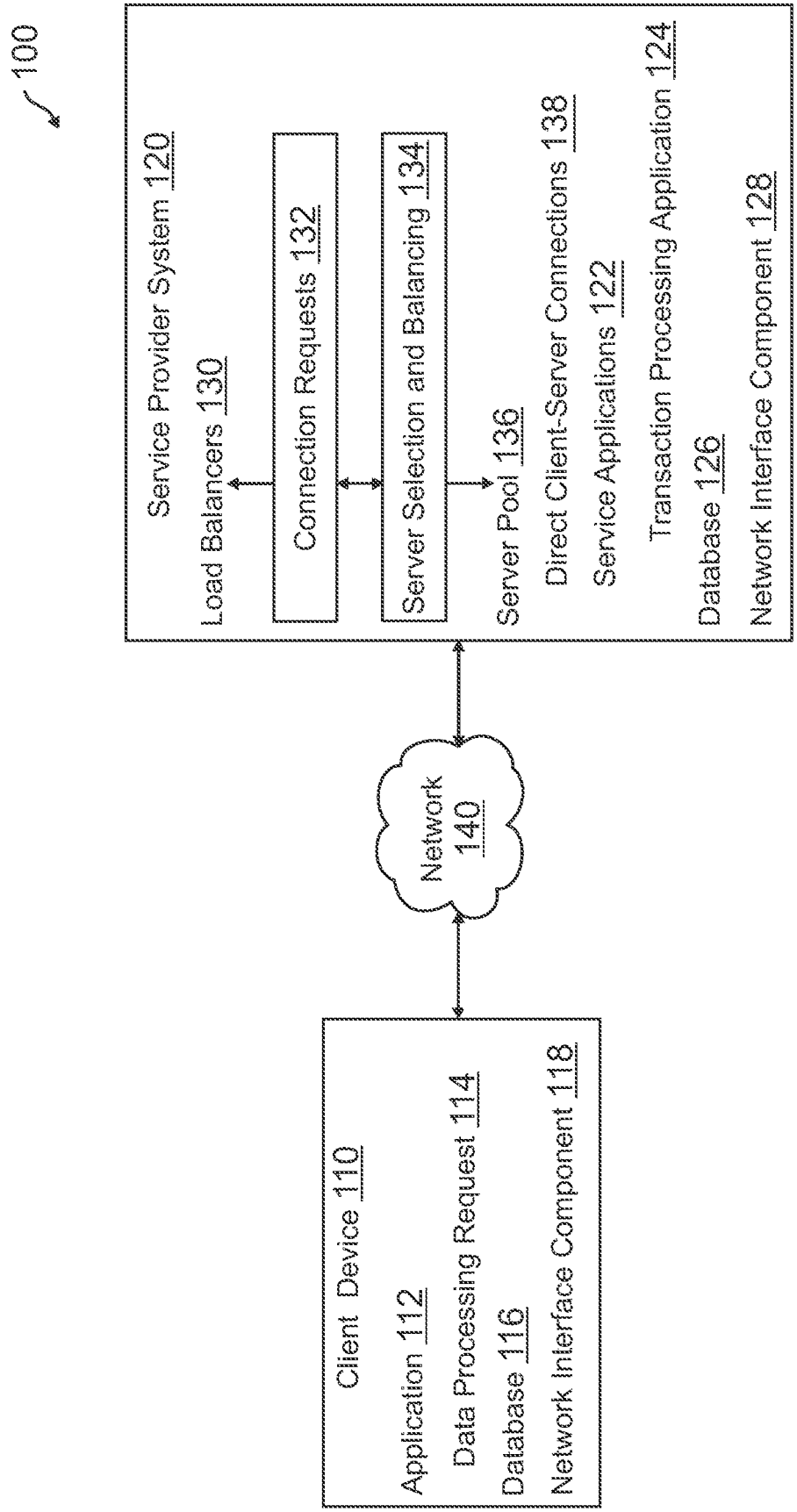
FIG. 1 is a block diagram of a networked system suitable for implementing the processes described herein, according to various embodiments.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for scalable service discovery and load balancing using direct client connections to servers. Systems suitable for practicing methods of the present disclosure are also provided.

A service provider may provide different computing resources and services to users through different websites, resident applications (e.g., which may reside locally on a computing device), and/or other online platforms. When client devices utilize the computing services of a particular service provider, the client devices may connect with servers of the service provider that process requests and provide responses for the corresponding computing services and resources. For example, an online transaction processor may provide services associated with electronic transaction processing, including account services, user authentication and verification, digital payments, risk analysis and compliance, and the like. The servers and systems for service discovery may utilize load balancers for balancing processing loads for different servers and/or instances of such servers in a pool or cluster (e.g., virtualized servers or other resources, such as in cloud computing environments with pools of machines or computes serving users). When a client device connects to a service provider, an initial handshake may be used to establish a secure connection between the client device and a load balancer for servers of the corresponding service, domain, pool or set of designated servers, or the like. Load balancers and load balancing may generally refer to processes and components to distribute incoming network traffic over backend servers for service provision. For example, a load balancer may distribute tasks (e.g., data processing requests and/or other requests for computing service use) over a set of resources (e.g., servers and instances of service applications running on such servers).

The load balancer may select a server for the client device based on a selection process, operation, or algorithm. Thereafter, the load balancer may forward the connection with the client device to the selected server, which then connects the client device to the server through the load balancer. However, instead of forwarding or transmitting requests and responses through the load balancer, the load balancer may facilitate the client device in pinging the server through that initial connection. The server may respond, through the load balancer, to the ping request, which provides a network address of the server to the client device. The client device may then execute operations and transmit data to establish a second, different, connection to the server directly without utilizing the load balancer as an intermediary. This connection may be used to facilitate exchange of requests and responses, such as application programming interface (API) calls or the like corresponding to data processing requests and/or data loads for processing by the server. The load balancer may then close the connection with the client device in order to preserve and not waste network resources, bandwidth, processor availability, and other computing resources by communication with the client device and/or server when acting as an intermediary to exchange data and messages.

In this regard, a user may utilize online service providers, such as transaction processors, via their available online and networked digital platforms that provides computing services through server instances for processing applications, platforms, and operations. The user may desire to make a payment to another user or otherwise transfer funds using the online platforms of the service providers. For example, a user may wish to process a transaction, such as for a payment to another user or a transfer. A user may pay for one or more transactions using a digital wallet or other account with an online service provider or transaction processor (e.g., PayPal®). An account may be established by providing account details, such as a login, password (or other authentication credential, such as a biometric fingerprint, retinal scan, etc.), and other account creation details. The account creation details may include identification information to establish the account, such as personal information for a user, business or merchant information for an entity, or other types of identification information including a name, address, and/or other information. The account and/or digital wallet may be loaded with funds or funds may otherwise be added to the account or digital wallet. The application or website of the service provider, such as PAYPAL® or other online payment provider, may provide payments and the other transaction processing services via the account and/or digital wallet.

The online payment provider may provide digital wallet and transaction processing services, which may offer financial services to send, store, and receive money, process financial instruments, and/or provide transaction histories, including tokenization of digital wallet data for transaction processing. The service provider and/or other service providers may also provide additional computing services, including social networking, microblogging, media sharing, messaging, business and consumer platforms, etc. These computing services may be deployed across multiple different websites and applications for different operating systems and/or device types. Furthermore, these computing services may utilize the aforementioned server resources through load balancers when processing data from client devices, such as when responding to connection and data processing requests. For example, access and use of these accounts, wallets, transaction processors, and the like may be performed in conjunction with the aforementioned server resources.

The user may utilize the account and/or other computing services provided by the service provider via one or more client computing devices, such as a personal computer, tablet computer, mobile smart phone, or the like. When engaging in these interactions with the service provider, the service provider may utilize servers to process data requests and loads and provide responses or other outputs. Servers may execute one or more computing tasks that process data from a data processing request and output a response to client devices. For example, computing tasks may correspond to executable code, operations, and/or models that may include a client device request processor, a compute for business rules, a data loader, a validation of a data load of the data processing request, a user authenticator, or a response builder for a decision, although other tasks may also be used. In this regard, servers may perform computing tasks that obtain an intended result based on a provided data load for a data processing request.

A data processing request may be a request from a client computing device, such as an end user or customer of the service provider system, which may request use of a computing service and provide a data load for processing. For example, a data processing request may be associated with a particular request for use of a computing service for account login, authentication, electronic transaction processing, risk or fraud, and other ones of the aforementioned computing services. Computing services may correspond to those provided via servers that are utilized by computing devices and may include computing platforms, architectures, and other systems for key-value stores, risk and fraud analysis, transaction processing, intelligent computes (e.g., artificial intelligence (AI), such as machine learning (ML) or neural network (NN) systems), servers hosting decision services and microservices, and the like. The services may be provided to client device through service discovery, which includes identification of a corresponding server instance for the requested computing service (e.g., an instance of the software and operations running or executing on a single physical or virtual server, machine, or other physical or virtualized resource).

In order to identify server instances, load balancers are used to provide load balancing operations where server instances are determined, identified, and/or selected based on a load balancing algorithm, selection process, and/or paradigm. This may correspond to load balancing algorithms including round robin, consistent hash, least connection, fastest response, or least load algorithms. For example, using the operations discussed herein, the load balancer may not have or may not be required to use load statistics for servers in a server pool, such as a number of connections with a server, a current load on a server, a server response time, and the like. Thus, statistics-based load balancing may require additional data retrievals and pings. For example, with a least connection algorithm, a dummy or forwarded connection between the load balancer and a server (which is being used by a client device over a separate connection) may remain open for the load balancer to obtain server statistics from the server. With a fastest response algorithm, periodic pings may be sent through this dummy connection to the server and/or other servers for server statistics (e.g., response times). Finally, with a least load algorithm, the client device may send ping requests over the dummy connection at a frequency proportional to the workload being processed in a separate connection by the client device to the server, which may be used to estimate or determine a load being put on the server by the client device. Thus, based on the number of pings, the load balancer may determine a load on one or more servers for a least load algorithm.

Thus, the load balancers may select servers or server instances based on the load-balancing algorithm using bi-directional network address translation (NAT). Conventionally, all requests and responses pass through the load balancers. This not only increases the overall time for the end-to-end computation but also makes the architecture ineffective. As discussed herein, load balancers may instead facilitate a direct connection to a server having instances of the corresponding computing service, application, or the like running in response to a client device request, which may then be designated for use by a client device.

The load balancer may determine server availability and/or server selection of a particular server and instance of the service requested for discovery from a client device (e.g., in response to a service discovery and/or connection request). A client device may connect to a service provider's system and request use of a computing service, which initiates a corresponding load balancer for service discovery. This connection and request establish a secure connection between the client device and the load balancer. The load balancer may then make a balancing decision and select a corresponding service instance (e.g., an instance of a computing application or service running on a server) for the computing service. The load balancing decision may correspond to selection of an available server to process a request, which balances processing loads over a pool of servers. The load balancing decision thereby balances tasks over the available resources in order to prevent overloading one or more servers and not providing loads to available servers, which may cause server failure, bottleneck issues, or processing slowdown without proper processing load distribution. Once selected, the secure connection between the load balancer and the client device may be forwarded and/or shared with the server for the service instance that was selected by the load balancer, which allows the client device to ping that service through the load balancer. In response to a ping request by the client device to the server, the server may provide a ping response having an IP address or other network address, device identifier, designation, or identifier of the server. This ping response may travel back through the load balancer to the client device using the first established secure connection. Using this network address or the like, the client device may then attempt to connect with the server.

If the client device successfully establishes a new secure connection (e.g., a second direct connection) with the server running the instance of the computing service, the client device and the server may then interact directly. This may include processing data, sending and receiving data processing requests and other API requests, providing API responses, and otherwise allow for sending requests, responses, and performing other interactions over the secure connection. Further, if the connection is successful, the first connection between the client device and the load balancer may be ended. That first connection, which further had been forwarded to the server for a connection, through the load balancer, between the client device and server, may no longer be necessary and data may be more quickly and efficiently processed directly between the client device and server. Further, the load balancer may not be involved in further requests, responses, API calls, data processing interactions, and the like, which reduces the processing load and bandwidth required by the load balancer.

This further provides improvements to system scalability by allowing the load balancer (and other load balancers) to handle more load balancing requests and not functionally limit the system as a bottleneck due to central processing unit or graphics processing unit availability and usage. For example, in conventional systems where the load balancers are required to process and transmit all incoming requests and responses between client devices and servers, one or more load balancer may become overwhelmed by incoming processing requests from client traffic. This may occur in conventional systems where client traffic may be expected to jump 30-40% (e.g., during a holiday season or event, new product release, sale or discount event, etc.). Thus, load balancers may require additional central processing unit (CPU) resources and usage and/or may overconsume available bandwidth and CPU availability and cause system crashes and/or errors.

However, ping requests and responses transmitted through the load balancers require fewer computing resources, bandwidth, and CPU usage. The ping requests and responses handled by load balancers may have lower data load sizes and processing requirements than data loads for processing by servers. Further, the load balancers may close or limit use of the connections through load balancers and with client device and servers during client device usage of servers, which may cause the issues with load balancer usage and CPU processing in conventional systems to be greatly reduced. Service providers may realize a significant reduction in CPU usage by load balancers, such as by freeing up 15% or more of CPU availability and usage at particular times. Thus, services providers may not be required to buy, use, and/or allocate more resources to load balancers, particularly in the event of expected client traffic increase.

In some embodiments, the load balancer may also keep the first connection open to monitor analytics, information, statistics, interaction and device/server availability, malicious conduct or computing attacks, and the like. For example, trust data, authentication, timeout data, etc., may be performed and/or monitored through the first connection. Additionally, with or without the first connection, the second direct connections between client device and server may be refreshed at certain points, which may require the client device to reconnect to the load balancer. This may cause a connection to be down due to periodic connection recycle (e.g., termination and/or ending of a connection and restarting of a new connection between the same devices), network issue, server failure or downtime, or the like. The process using the load balancer may be reinitiated on reconnection by the client device. However, the second connection may provide enhanced resiliency in case of load balancer failure where the server and client device may continue to function and interact separate from the load balancer.

In some embodiments, the client device may receive the IP address of the server but may be unsuccessful during attempts to connect directly to the server. For example, the direct connection by the client device to the server may fail because such a connection is not allowed due to a firewall or the like, the selected server instance may go offline or become unavailable, or another reason. In such embodiments, the failure may be logged and the first connection, which may be maintained and open between the client device and load balancer, may be used for client requests and responses so that the client is not impacted and may interact with the server through the load balance. In some embodiments, if the reason for failure is a firewall or the like that prevents the second direct connection, the firewall or other system component may be setup to allow direct access so that the same or similar error may not occur. Further, if the server goes offline or become unavailable, the load balancer may end the first connection and restart from the beginning to find a new server that is available and online. In this regard, when establishing a new first connection to provide a network address that facilitates a second direction connection between the client device and a server instance, the load balancer may utilize the load balancing algorithm to select a new server, forward the first connection in similar fashion to the new server, and allow the client device to ping that newly selected server for a network address and direct connection. This may continue until successful server establishment. In other embodiments, the load balancer may immediately disconnect and if client device does not connect to the initially selected server, the client device and/or the load balancer (or another load balancer on reconnect) may process a future request from the client device for service discovery.

Thus, a hybrid service discover approach may be used where clients may use load balancers for discovery of available server instances instead of all communications, data processing, and traffic (e.g., sending API calls or other requests and/or receiving responses) being routed through load balancers. Instead, the majority of traffic may be sent over a connection directly by a client to a server thereby offloading all but a small portion of the traffic from going through load balancers and decreasing load balancer workload in this hybrid service discovery approach. This also requires one less hop during network traffic, which may improve response times and latency. The hybrid approach does not require the complexity of client-side service discovery approaches that require implementation and maintenance of a service registry, as well as a client needing to query and use the service registry while carrying out load balancing.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entity.

System 100 includes a client device 110 and a service provider system 120 in communication over a network 140. Client device 110 may be utilized by a user to access a computing service or resource provided by service provider system 120, where service provider system 120 may provide various data, operations, and other functions to client device 110 via network 140. These computing services may utilize servers and instances of computing service applications, platforms, and the like to provide computing services for data processing. In this regard, client device 110 may be used to access a website, application, or other platform that provides computing services via server instances of the computing service running on different servers in a pool or cluster of servers. Service provider system 120 may provide these computing services that process data in response to data processing requests by utilizing load balancing operations and components for service discovery and server selection. In this regard, the load balancing operations may connect client device 110 with one or more server instances directly to provide scalable use of the load balancing operations and components by reducing load balancing data processing and communication requirements.

Client device 110 and service provider system 120 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 140.

Client device 110 may be implemented as a communication device that may utilize appropriate hardware and software configured for wired and/or wireless communication with service provider system 120. For example, in one embodiment, client device 110 may be implemented as a personal computer (PC), a smart phone, laptop/tablet computer, wristwatch with appropriate computer hardware resources, eyeglasses with appropriate computer hardware (e.g., GOOGLE GLASS® and/or other headsets including metaverse configured headsets), other type of wearable computing device, implantable communication devices, and/or other types of computing devices capable of transmitting and/or receiving data. Although only one device is shown, a plurality of devices may function similarly and/or be connected to provide the functionalities described herein.

Client device 110 of FIG. 1 contains an application 112, a database 116, and a network interface component 118. Application 112 may correspond to executable processes, procedures, and/or applications with associated hardware. In other embodiments, client device 110 may include additional or different modules having specialized hardware and/or software as required.

Application 112 may correspond to one or more processes to execute software modules and associated components of client device 110 to provide features, services, and other operations for a user over network 140, which may include accessing and utilizing computing services provided by service provider system 120. In this regard, application 112 may correspond to specialized software utilized by a user of client device 110 that may be used to access a website or application (e.g., mobile application, rich Internet application, or resident software application) that may display one or more user interfaces that allow for interaction with the computing services of service provider system 120. In various embodiments, application 112 may correspond to a general browser application configured to retrieve, present, and communicate information over the Internet (e.g., utilize resources on the World Wide Web) or a private network. For example, application 112 may provide a web browser, which may send and receive information over network 140, including retrieving website information, presenting the website information to the user, and/or communicating information to the website. However, in other embodiments, application 112 may include a dedicated application of service provider system 120 or other entity.

Application 112 may utilize, provide, process, and/or otherwise be associated with account information, user financial information, and/or transaction histories. Such information may be utilized when engaging with electronic transaction processing, account, and/or other digital transaction computing services. However, in further embodiments, different services may be provided via application 112, including social networking, media posting or sharing, microblogging, data browsing and searching, online shopping, and other services available through service provider system 120. Thus, application 112 may also correspond to different service applications and the like. When utilizing application 112 with service provider system 120, application 112 may request processing of a data processing request 114, such as by providing a data load for data processing request 114 or other data, data endpoints or resources, identifiers, and the like when utilizing one or more computing services of service provider system 120. Data processing request 114 may correspond to account login, authentication, electronic transaction processing, and/or use of other services described herein.

Data processing request 114 may have a corresponding data load that is processed via one or more instances of a corresponding computing service (e.g., application, platform, or other computing operations and executable code) running on one or more servers of service provider system 120 that interact with different client devices. As such, application 112 may be used with the servers of service provider system 120, which may be assigned to and accessed by application 112 of client device 110 through different load balancing operations and components. The load balancing by service provider system 120 may be provided, as discussed herein, to facilitate direction connections between client device 110 and one or more servers of service provider system 120, which may correspond to physical and/or virtualized resources available to run instances of a computing service. In this regard, application 112 may be used to connect with load balancers, provide requests and receive responses from load balancers, send or transmit ping requests for IP or other network address of a server through a load balancer, receive the corresponding response and network address from the server through the load balancer, and directly connect with the corresponding server, as discussed herein.

In various embodiments, client device 110 includes other applications as may be desired in particular embodiments to provide features to client device 110. For example, the other applications may include security applications for implementing client-side security features, programmatic client applications for interfacing with appropriate application programming interfaces (APIs) over network 140, or other types of applications. The other applications may also include email, texting, voice and IM applications that allow a user to send and receive emails, calls, texts, and other notifications through network 140. In various embodiments, the other applications may include financial applications, such as banking applications. Other applications may include social networking applications, media viewing, and/or merchant applications.

The other applications may also include other location detection applications, which may be used to determine a location for the user, such as a mapping, compass, and/or GPS application, which can include a specialized GPS receiver that determines location information for client device 110. The other applications may include device interface applications and other display modules that may receive input from the user and/or output information to the user. For example, the other applications may contain software programs, executable by a processor, including a graphical user interface (GUI) configured to provide an interface to the user. The other applications may therefore use devices of client device 110, such as display devices capable of displaying information to users and other output devices, including speakers.

Client device 110 may further include database 116 stored on a transitory and/or non-transitory memory of client device 110, which may store various applications and data and be utilized during execution of various modules of client device 110. Database 116 may include, for example, identifiers such as operating system registry entries, cookies associated with application 112 and/or the other applications, identifiers associated with hardware of client device 110, or other appropriate identifiers, such as identifiers used for payment/user/device authentication or identification, which may be communicated as identifying the user/client device 110 to service provider system 120. Moreover, database 116 may include data used for data processing request 114, as well as data necessary to process data processing request 114 with a server, such as a received network address to facilitate a connection between client device 110 and a server directly without requiring an intermediary load balancer.

Client device 110 includes at least one network interface component 118 adapted to communicate with service provider system 120 and/or other devices and servers over network 140. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider system 120 may be maintained, for example, by an online service provider, which may provide computing services via different servers, server clusters, and/or serverless computing environment hosting virtualized resources. In this regard, service provider system 120 includes one or more processing applications which may be configured to interact with client device 110. For example, service provider system 120 may deploy computing services through various instances of such services on servers and server clusters, which may be provided to users based on load balancing operations discussed herein. In one example, service provider system 120 may be provided by PAYPAL®, Inc. of San Jose, CA, USA. However, in other embodiments, service provider system 120 may be maintained by or include another type of service provider.

Service provider system 120 of FIG. 1 includes load balancers 130, service applications 122, a database 126, and a network interface component 128. Load balancers 130 and service applications 122 may correspond to executable processes, procedures, and/or applications with associated hardware. In other embodiments, service provider system 120 may include additional or different modules having specialized hardware and/or software as required.

Load balancers 130 may correspond to one or more processes to execute modules and associated specialized hardware of service provider system 120 to provide load balancing during service discovery for computing services of service provider system 120, such as those service for account usage, digital electronic communications, electronic transaction processing, key-value stores, risk and fraud analysis, AI (e.g., rule-based, ML, or NN models and the like for intelligent processing and outputs), decision services and microservices and the like. In this regard, load balancers 130 may correspond to specialized hardware and/or software that may be engaged with by a user associated with client device 110 when connecting to and attempting to utilize one or more computing services through service applications 122, such as when client device 110 connects to an application, website, digital platform, or other system and requests service discovery for service use. For example, service applications 122 may include and/or provide various applications, such as those that may correspond to electronic transaction processing, payment accounts, payment messaging, and the like. Service applications 122 may also include social networking, media posting or sharing, microblogging, data browsing and searching, online shopping, and other services available through service provider system 120. Various instances of service applications 122 may be hosted by servers from server pool 136, which may be accessible by client device 110 and/or other devices after connecting and performing service discovery.

Conventionally, client device 110 and other devices or servers may connect to and utilize the servers by transmitting requests through load balancers 130 after establishment of a secure connection and delegation of a server instance for use. However, as discussed herein, scalable service discovery may be performed through direct connection facilitated using load balancers 130 utilizing the operations and components detailed herein. For example, the computing services may be accessed and/or used through a browser application and/or dedicated payment application executed by client device 110, such as application 112 that displays UIs from service provider system 120. Such account services, account setup, authentication, electronic transaction processing, and other computing services of service applications 122 may utilize load balancers 130 to provide server instances of service applications 122 from servers in a server pool 136. Initially, client device 110 may connect with service provider system 120 to process data processing request 114. Thus, load balancers 130 may receive connection requests 132 from client device 110 and/or other devices and servers. Connection requests 132 may correspond to initial client device connections with service provider system 120 for service discovery (e.g., identification and connection to a server running an instance of an application or computing service requested for use by the client devices). Thus, connection requests 132 may correspond to client devices initially connecting to service provider system 120 via load balancers 130 for service discovery.

In this regard, client device 110 may be connected to one of load balancers 130 based on one of connection requests 132, where client device 110 is requesting processing of data processing request 114 from a service instance running on a server from server pool 136 of service provider system 120. Load balancers 130 may include load balancing operations to balance server assignment and delegation or assignment of server instances to devices and servers for data processing. Server selection and balancing 134 may correspond to executable operations and code for load balancers 130 that may be used to select a server instance running the desired computing service requests by client device 110 and assign that server instance to client device 110. Server selection and balancing 134 may use a round robin server selection operation, a consistent hashing operation or technique that uses at least one of source IP address and a source port as a hash key, a server availability for server pool 136, server load statistics for server pool 136, or a machine learning model for server balancing of server pool 136.

In this regard, server selection and balancing 134 may utilize machine learning models to select a server, such as based on data of server availability and/or server availability predictions. Load balancers 130 may receive server availability data and the like that may be used for and/or with server selection and balancing 134 for server instance selection and assignment to devices and servers. In some embodiments, ML models and engines, or other AI model, such as rule-based or NN models may generally correspond to any AI that performs decision-making. However, AI models may also include subcategories, including ML models and NN models that instead provide intelligent decision-making using algorithmic relationships. Generally, NN may include deep learning models and the like, and may correspond to a subset of ML models that attempt to mimic human thinking by utilizing an assortment of different algorithms to model data through different graphs of neurons, where neurons include nodes of data representations based on the algorithms that may be interconnected with different nodes. ML models may similarly utilize one or more of these mathematical models, and similarly generate layers and connected nodes between layers in a similar manner to neurons of NN models.

In response to connection requests 132 from devices and servers, such as client device 110, and selection of a server instance from server pool 136 using server selection and balancing 134, connections may be forwarded and/or provided to corresponding servers through load balancers 130.

For example, client device 110 may be connected to a server from server pool 136 running an instance of the service corresponding to data processing request 114 through one of load balancers 130 after forwarding the connection initially established between that load balancer and client device 110. Client device 110 may then ping the server from server pool 136 through a ping request transmitted through the load balancer from load balancers 130 facilitating the connection. The server may respond with a ping response having a network address, such as an IP address or other data needed for a direct connection, through the load balancer facilitating the connection. Thereafter, direct client-server connections 138 may be facilitated, such as one between client device 110 and the corresponding server from server pool 136. Direct client-server connections 138 do not need to be provided through load balancers 130, thereby reducing the data processing, bandwidth, and exchanges network communications required by load balancers 130. In this regard, direct client-server connections 138 are separate from connection requests 132 and between the client devices and servers directly without incorporating load balancers 130. For example, for one of direct client-server connections 138 between client device 110 and one of the servers in server pool 136, data processing request 114 may then be handled and processed without the data load being transmitted through and using one or more of load balancers 130. This provides more scalability to load balancers 130 by reducing the processing power and network resources consumed by load balancers 130 and freeing load balancers 130 to perform further load balancing operations without being assigned a dedicated connection to a single or limited number of devices during computing service use.

Service applications 122 may correspond to one or more processes to execute modules and associated specialized hardware of service provider system 120 to process a transaction or provide another service to customers or end users of service provider system 120, for example, using computing service instances executing or running on servers from server pool 136. In this regard, service applications 122 may correspond to applications that may run on different servers and connect with client devices for provision of computing services and data processing. Service applications 122 may include various different types of applications, operations, and the like that provide computing services. For example, transaction processing application 124 may correspond to software, which may be executed by physical and/or virtualized resources (e.g., servers), that is used by service provider system 120 to provide computing services to users associated with transaction or payment processing, which may include electronic transaction processing and/or other computing services in response to receiving transaction data. In some embodiments, transaction processing application 124 may be used by users, such as a user associated with client device 110, to establish user and/or payment accounts, as well as digital wallets, which may be used to process transactions. Accounts may be accessed and/or used through one or more instances of a web browser application and/or dedicated software application executed by client device 110 and engage in computing services provided by transaction processing application 124.

In various embodiments, financial information may be stored to the account, such as account/card numbers and information. A digital token for the account/wallet may be used to send and process payments, for example, through an interface provided by transaction processing application 124 or another one of service applications 122. The payment account may be accessed and/or used through a browser application and/or dedicated payment application executed by client device 110 and engage in transaction processing through transaction processing application 124. Transaction processing application 124 may process the payment and may provide a transaction history to client device 110 for transaction authorization, approval, or denial. In other embodiments, service applications 122 may also or instead provide different computing services, including social networking, microblogging, media sharing, messaging, business and consumer platforms, etc. Such services may be utilized through user accounts, websites, software applications, and other interaction sources.

Service applications 122 may also provide additional features to service provider system 120. For example, service applications 122 may include security applications for implementing server-side security features, programmatic client applications for interfacing with appropriate application programming interfaces (APIs) over network 140, or other types of applications. Service applications 122 may contain software programs, executable by a processor, including one or more GUIs and the like, configured to provide an interface to the user when accessing service provider system 120, where the user or other users may interact with the GUI to more easily view and communicate information. In various embodiments, service applications 122 may include additional connection and/or communication applications, which may be utilized to communicate information to over network 140.

Additionally, service provider system 120 includes database 126. Database 126 may store various identifiers associated with client device 110. Database 126 may also store account data, including payment instruments and authentication credentials, as well as transaction processing histories and data for processed transactions. Database 126 may store financial information and tokenization data. Database 126 may further store data associated with load balancers 130 and/or server pool 136, such as availability of servers for selection, load balancing data, IP and other network or device addresses or identifiers, and the like. Further, data processing requests, such as data processing request 114, and results and/or retrieved data may be stored in database 126.

In various embodiments, service provider system 120 includes at least one network interface component 128 adapted to communicate client device 110 and/or other devices and servers over network 140. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 140 may be implemented as a single network or a combination of multiple networks. For example, in various embodiments, network 140 may include the Internet or one or more intranets, landline networks, wireless networks, and/or other appropriate types of networks. Thus, network 140 may correspond to small scale communication networks, such as a private or local area network, or a larger scale network, such as a wide area network or the Internet, accessible by the various components of system 100.

Figure 2:
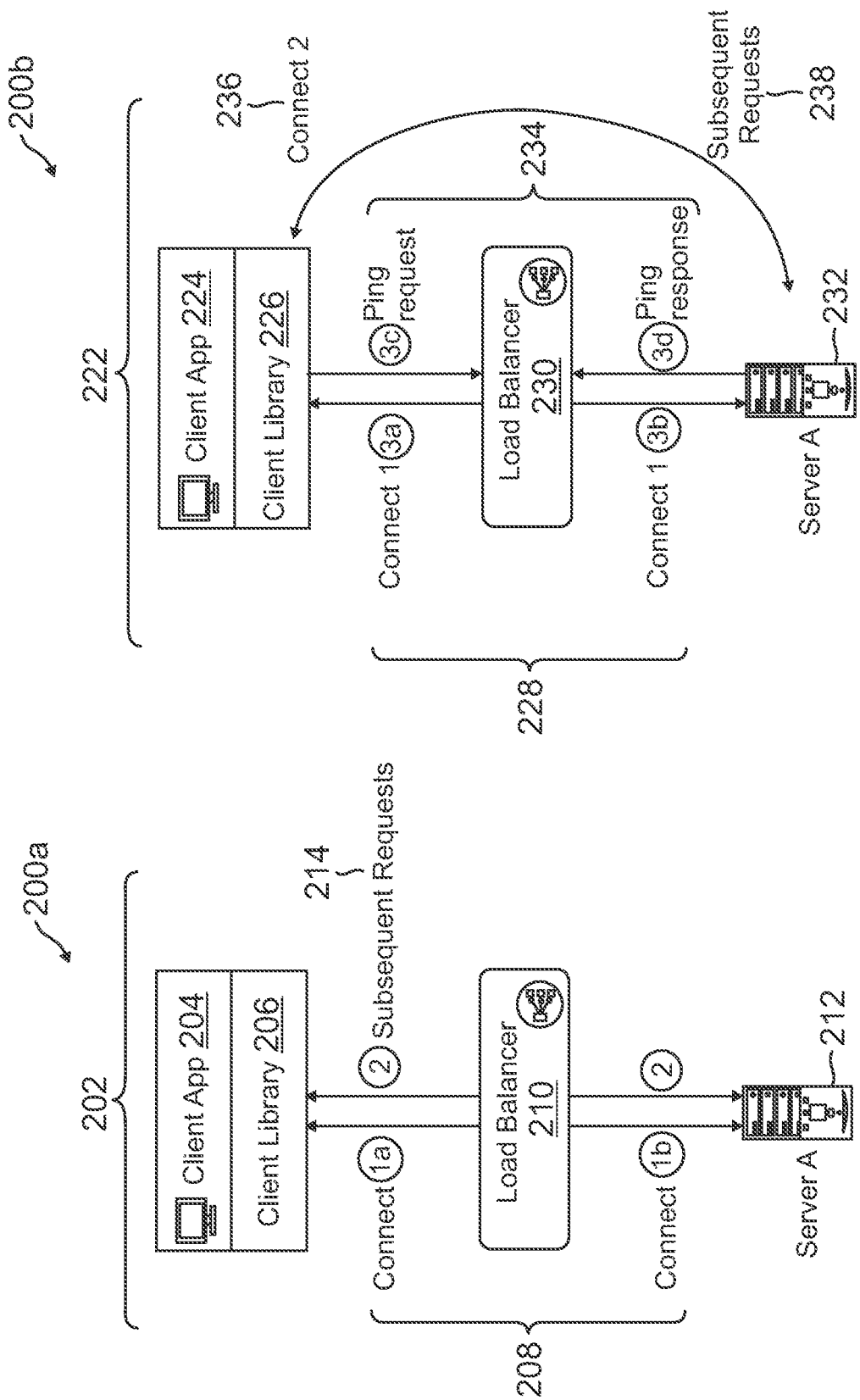
FIGS. 2A and 2B are exemplary diagrams of different service discovery operations by load balancers to transition to scalable service discovery by facilitating direct client-to-server connections, according to various embodiments.

FIGS. 2A and 2B are exemplary diagrams 200a and 200b of different service discovery operations by load balancers to transition to scalable service discovery by facilitating direct client-to-server connections, according to various embodiments. Diagram 200a includes system 202 where a load balancer 210 provides communications for service provision between a client application 204 and a server 212, while diagram 200b includes a system 222 where a load balancer 230 facilitates a direct connection between a client application 224 and a server 232 for communications and service provision. In this regard, systems 202 and 222 may correspond to those components discussed in reference to system 100 of FIG. 1, such as client device 110 (e.g., a device that may provide client applications 204 and 224), load balancers 130 (e.g., as load balancers 210 and 230), and/or server pool 136 (e.g., which may include servers 212 and 232).

In systems 202 and 222 of diagrams 200a and 200b, respectively, connection and data processing flows of the connections and communications sent when providing service discovery and computing service use to clients are shown. For example, in system 202, load balancer 210 may provide service discovery and computing services to clients by passing or communicating requests and responses between clients and servers (e.g., client application 204 and server 212), which causes bottleneck issues and high processing loads for load balancer 210. This reduces the scalability of load balancer 210. When providing service discovery and computing service use, client application 204 may use a client library 206 to establish a connection 208, where a part 1a of connection 208 is established between client application 204 and load balancer 210 (e.g., using operations, identifiers, and/or addresses for load balancer 210 and/or the corresponding service provider or computing service in client library 206). Load balancer 210 forwards connection 208 to server 212 during a part 1b of connection 208. Thereafter, subsequent requests 214 (as well as any responses or other API calls and the like) in a part 2 of connection 208 are exchanged through load balancer 210 via connection 208 when transmitted and/or received by client application 204 and server 212.

In contrast to system 202, in system 222, load balancer 230 may instead directly connect client application 224 to server 232 (as shown in second connection 236) after receiving a connection request and performing load balancing of servers and server instances in the pool having server 232. This may allow more operations and processing to be provided by load balancer 230, increasing scalability and providing reduced computational requirements and usage for load balancer 230. For example, client application 224 may utilize a client library 226 to transmit a connection and/or data processing request to load balancer 230 via a first connection 228. First connection 228 may function similar to connection 208 in that initially, client application 224 is connected to load balancer 230 during a part 3a of first connection 228 and the data connection and/or exchange (e.g., data packets) are forwarded by load balancer 230 to server 232 during a part 3b of first connection 228, thereby connecting client application 224 to server 232 through load balancer 230.

However, in contrast to utilizing connection 208 for subsequent requests 238 as shown in system 202 (FIG. 2A), in system 222, connection 208 is used to facilitate an exchange of pings and/or other request for a network address (or other information) that allow for client application 224 to directly connect with server 232 without utilizing load balancer 230. Thus, client library 226 may be configured, coded, or otherwise created to allow for exchange of pings 234 between client application 224 and server 232. Client application 224 may issue a ping request during a part 3c of first connection 228, which may be transmitted to server 232 through load balancer 230 (e.g., when using first connection 228). Server 232 responds with a ping response during a part 3d of first connection 228, which may provide a network address or other addresses, identifiers, or information necessary for client application 224 to connect directly with server 232.

Thus, during pings 234, client application 224 may receive a network address (or other information) to connect with server 232. Pings 234 be less CPU intensive on load balancer 230 than other requests and data loads, such as those used when processing a data load and request for computing service usage. Thus, pings 234 may conserve CPU usage and other processing resources, bandwidth, and the like, which may free up system and network resources for load balancer 230 and/or other system components (e.g., to process further requests and/or service discovery operations). This allows load balancer 230 to no longer be required to exchange requests and responses between client application 224 and server 232, thereby reducing the processing usage and load on load balancer 230. Client application 224 may utilize the received network address with client library 226 to establish a second connection 236 with server 232. This may correspond to a direct connection, or a connection that does not require use of load balancer 230 as an intermediary, between client application 224 and server 232 on a network. Subsequent requests 238 may then be exchanged via second connection 236. Further, first connection 228 may be ended or suspended so that load balancer 230 may be freed up to perform other load balancing operations. However, prior to ending first connection 228, load balancer 230 and/or one or more of client application 224 and server 232 may ensure that second connection 236 has been established. If so, client application 224 and/or server 232 may provide a signal to load balancer 230 to end first connection 228 or load balancer may time out first connection 228 after an amount of time (or possibly after detecting successful establishment of second connection 236). If second connection 236 is not successful, load balancer 230 may utilize first connection 228 or another connection to further facilitate client application 224 with establishing a direct connection to a server and a computing service instance running on that server. Further, first connection 228 may remain open in some embodiments, to monitor data, analytics, and/or activity associated with second connection 236, as well as facilitate further computing operations (e.g., authentication, use of other servers and service instances such as different computing service invocation, etc.).

Figure 3:
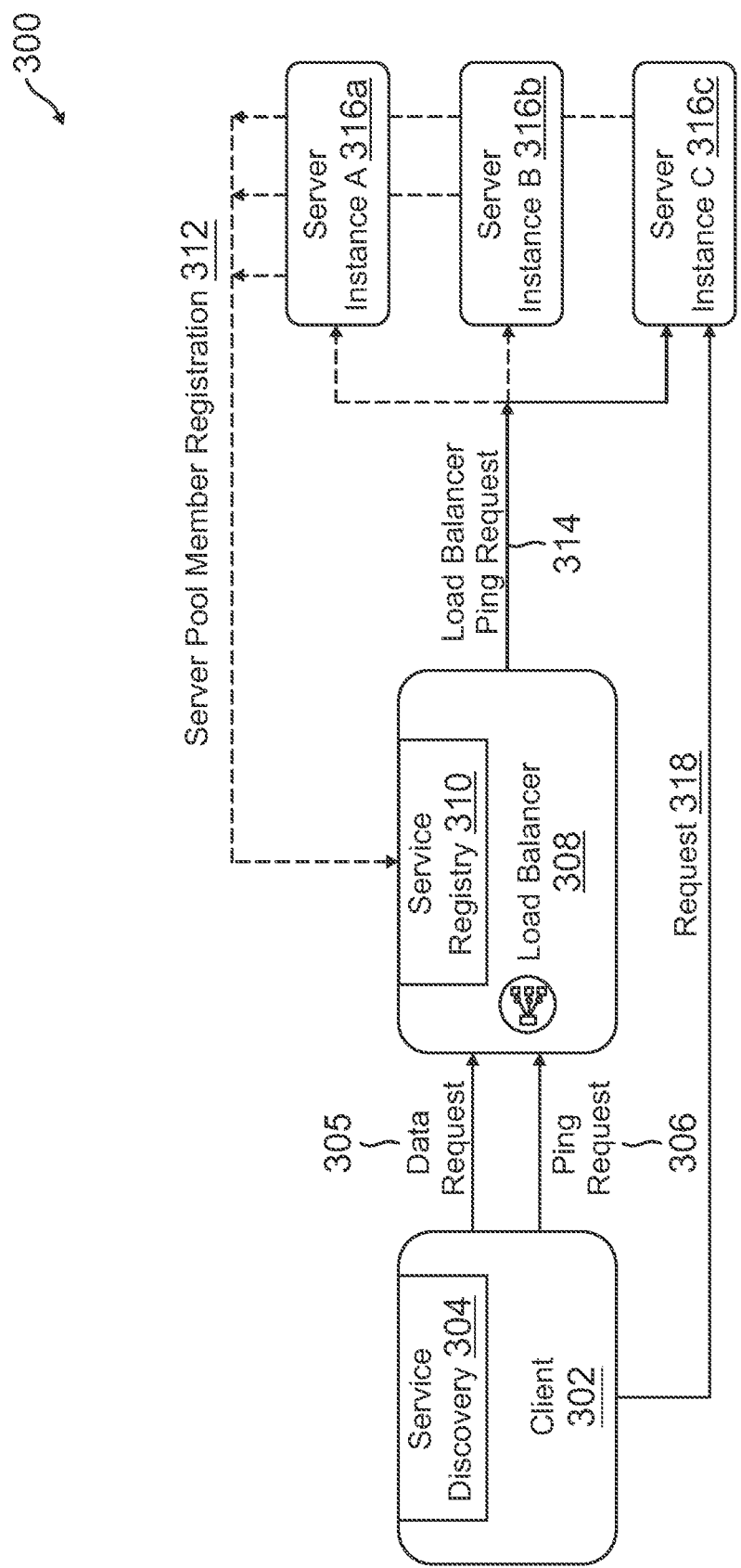
FIG. 3 is an exemplary system environment where a client device may connect directly with a server of a service provider during service discovery using a load balancer to discover available server instances, according to various embodiments.

FIG. 3 is an exemplary system environment 300 where a client device may connect directly with a server of a service provider during service discovery using a load balancer to discover available server instances, according to various embodiments. System environment 300 of FIG. 3 includes a client 302 interacting with a load balancer 308 during a service discovery 304, where client 302 and load balancer 308 may correspond generally to client device 110 and load balancers 130 discussed in reference to system 100 of FIG. 1. Service discovery 304 may correspond to a process by client 302 executed with load balancer 308 to detect and determine devices, servers, and/or computing services available on a computing system, such as to identify computing services running on devices or servers in a computing architecture of a service provider. In this regard, client 302 may access and connect with load balancer 308 in order to receive a server designation and facilitate a direct connection to a server instance for a computing service in a client-side manner for service discovery 304 instead of a server-side connection through load balancer 308.

In system environment 300, client 302 initially requests data processing, such as by providing one or more connection requests and/or data loads through data request 305 that requires action from a computing service of a service provider. For example, in system 100 of FIG. 1, client device 110 may provide one or more of connection requests 132 to one or more of load balancers 130 for the initial connection and request for data processing. Similarly, in diagrams 200a and 200b, data request 305 may correspond to part 3a of first connection 228. Load balancer 308 may be invoked in order to connect with client 302 and direct the data processing request (e.g., data processing request 114 in system 100 of FIG. 1) and other communications to a server instance (e.g., server instance A 316a, server instance B 316b, server instance C 316c, which may correspond generally to instances of service applications or the like running on servers from server pool 136 in system 100 of FIG. 1) for processing, as well as provide server responses when responding to client 302. In this regard, load balancer 308 and other load balancers may be responsible for service and/or task orchestrations and consolidation of task executions during runtime that assign client 302 and other clients to servers for computing service execution and processing. Conventionally, communications between the clients and servers occur through load balancer 308 or other load balancers.

However, in system environment 300, load balancer 308 may make a balancing decision of a server instance of the computing services running on a corresponding server that is provided to client 302, such as based on a service registry 310 from service pool member registration 312. Service pool member registration 312 may correspond to registration of servers in a pool of servers that are usable for running or executing instances of one or more computing services, applications, platforms, operations, or the like. This may be based on capabilities, accessibility, availability, and other statistics or server information for the servers. For example, a server instance A 316a, a server instance B 316b, and a server instance C 316c may be registered in service registry 310 through service pool member registration 312 based on the availability of such servers to execute the service instances and provide computing services to clients, such as client 302.

During service discovery 304 on client 302, load balancer 308 may make a decision of server instance A 316a, server instance B 316b, or server instance C 316c based on a load balancing algorithm or the like. Such load balancing may correspond to a round robin, consistent hash, least connection, fastest response, or least load algorithms and techniques for server selection. Client 302 and load balancer 308 may connect through a secure Transmission Control Protocol (TCP) or Secure Sockets Layer (SSL), and load balancer 308 may choose a server, translate the destination address of that server from a virtual IP address, and forward the packets to the chosen server using the destination address (e.g., as a server address for that server). The forwarded packets may correspond to the network traffic and data load that established the connection between client 302 and load balancer 308. As shown in system environment 300, load balancer 308 has used service registry 310 to select server instance C 316c. Whereas in FIGS. 2A and 2B, a server may be selected based on client libraries 206 and 226, FIG. 3 displays selection of one of server instance A 316a, server instance B 316b, or server instance C 316c based on service registry 310 generated from service pool member registration 312. After server selection, client 302, during service discovery 304, may transmit a ping request 306 to load balancer 308, which forwards the request through the secure connection to server instance C 316c via load balancer ping request 314.

Based on this, server instance C 316c may respond with a ping response, which is transmitted back through load balancer 308 to client 302. For example, the ping response may correspond to the ping response from pings 334 provided during part 3*d* of first connection 228 in diagram 200*b* of FIG. 2B. The ping response may include an IP address or other address or identifier (e.g., device, network, etc.) for server instance C 316c. Client 302 may further execute operations client-side for service discovery 304 to then transmit a request 318 directly to server instance C 316c to connect and exchange data, requests, and responses. Thereafter, load balancer 308 is no longer required to facilitate communications between client 302 and server instance C 316c and may end the connection with client 302 to reduce open connections and utilized processing or network resources.

Thus, load balancer 308 may terminate or otherwise end the secure connection with client 302 and may be available for further load balancing and service discovery operations, including reconnection of client 302 to another one of server instance A 316a, server instance B 316b, or server instance C 316c during connection recycle, if the direction connection is ended or unsuccessful initially, or the like. For example, ping request 306 and load balancer ping request 314 may be transmitted via a first connection between client 302, load balancer 308, and server instance C 316c, which uses load balancer 308 to send and receive messages between client 302 and server instance C 316C. However, once a second connection is established directly between client 302 and server instance C 316c to transmit requests 318, the first original connection may be ended so that load balancer 308 is no longer required. While adding an additional handshake to retrieve a real server IP address and establish the new second connection may appear to add latency (e.g., through forwarding of the first connection to transmit load balancer ping request 314), in systems that use persistent connections and a connection pool, the connection may be preestablished in such a connection pool (e.g., via a background thread). Thus, client would not experience any delay or latency in systems using persistent connections and connection pools. In other systems, the reduction is load balancer workload, lag, or processing latency my offset and/or negate the latency caused by additional connections that are created and not persistent or from a preestablished connection pool. Further, where client 302 may recycle connections to servers periodically (e.g., every 9 to 30 seconds or some other period time period), the new connection may be established with load balancer 308 again or another load balancer for connection with an available server and server instance of the requested computing service, as discussed herein.

However, load balancer 308 may keep that first connection open in the event that request 318 fails to establish a second connection between client 302 and server instance C 316c directly. If the second connection is not successfully established, load balancer 308 may log the issue that causes the failure of the second connection, such as whether a firewall or other system component prevents the connection or server instance C 316c goes offline or otherwise becomes unavailable. If the logged cause of the connection failure is a result of a firewall or other system component preventing the connection, load balancer 308 and/or another system process or operation may perform setup to allow such connections in the future and reduce or eliminate such failures and errors. Further, load balancer 308 may utilize the preexisting connection with client 302 to perform further actions during service discovery 304 for processing client requests and responses between client 302 and server instance C 316c, including forwarding or transmitting client requests and server responses during data processing requests and other computing service usage.

If server instance C 316c becomes unavailable, such as by going offline, having an error, or the like, load balancer 308 may perform additional operations for service discovery 304 that may provide identification of an available server instance and facilitating a direct connection to that server. For example, load balancer 308 may end the first connection and restart with client 302 to determine a new server, may select server instance A 316a next, if available, and may then forward any ping requests and responses between client 302 and server instance A 316a that facilitate service discovery 304, determination of a network address for server instance A 316a and a direct connection between client 302 and server instance A 316a. Further, the first connection may remain open to collect and/or determine service usage information and requests/responses between client 302 and server instance C 316c, as well as perform any further authentication, trust, or other activities to facilitate data processing with client 302.

Figure 4:
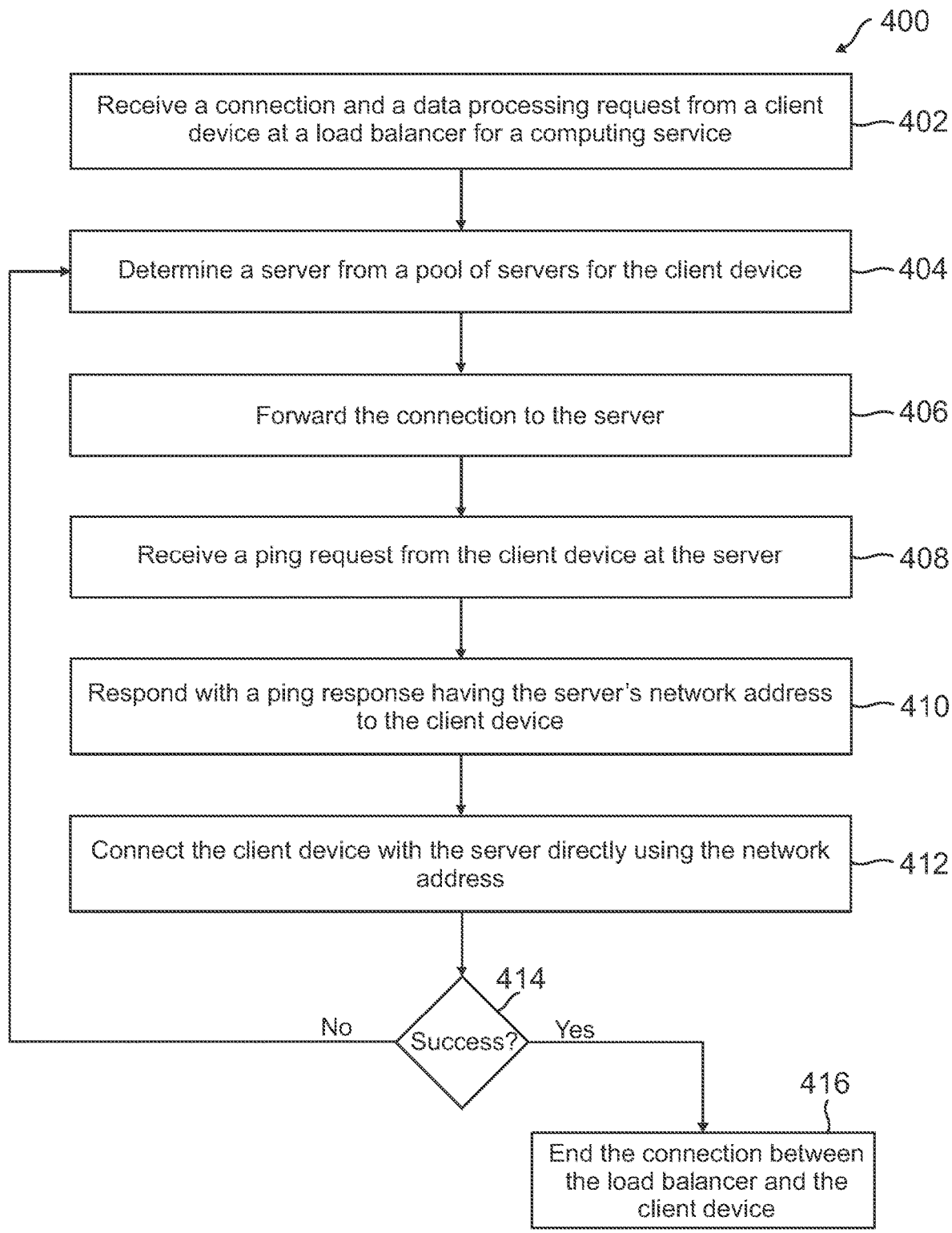
FIG. 4 is a flowchart of an exemplary process for scalable service discover and load balancing using direct client connections to servers, according to various embodiments.

FIG. 4 is a flowchart 400 of an exemplary process for scalable service discover and load balancing using direct client connections to servers, according to various embodiments. Note that one or more steps, processes, and methods described herein of flowchart 400 may be omitted, performed in a different sequence, or combined as desired or appropriate.

At step 402 of flowchart 400, a connection and data processing request from a client device is received at a load balancer for a computing service. For example, in system 100 of FIG. 1, client device 110 may connect with service provider system 120 for service discovery and connection to a server running an instance of a requested computing service to process data processing request 114. This may be shown by part 3*a* of first connection 228 in diagram 200*b* of FIG. 2B. The data processing request may come in through a gateway and may be requested for processing by one or more computing services executing via one or more servers, server nodes, or the like (e.g., physical or virtualized resources) of the computing architecture, such as a service provider. The computing architecture may use servers to provide instances of particular services, such as key value stores, authentication, login, transaction processing, risk and fraud detection, micro-services, and the like in order to provide an output and computational decision. Thus, on connection to the service provider, the client device is connected to the load balancer for load balancing decisions. At step 404, a server from a pool of servers for the client device is determined. For example, in system 100 of FIG. 1, one of load balancers 130 of service provider system 120 may determine a server from server pool 136 for use with client device 110. This may be shown by operations performed by load balancer 230 in diagram 200*b* of FIG. 2B. The data load may be provided during the data processing request or may be accessed based on identifiers, data, and/or requests for data from the data processing request. The server may be selected based on a load balancing technique or algorithm, such as a round robin technique, a consistent hashing technique, a least connection technique, a fastest response technique, or a least load technique.

At step 406, the connection is forwarded to the server. For example, in system 100 of FIG. 1, one of load balancers 130 of service provider system 120 may forward the connection between the load balancer and client device 110 to the selected server from server pool 136. This may be shown by part 3b of first connection 228 in diagram 200b of FIG. 2B. After server selection by the load balancer, the load balancer may forward packets for the connection and data processing request to the server, thereby connecting the client device with the server via the load balancer. At step 408, a ping request from the client device is received at the server. For example, in system 100 of FIG. 1, client device 110 may transmit a ping request to the corresponding one of load balancers 130 connecting client device 110 to the selected server from server pool 136, where the load balancer may then transmit that ping request to the server. This may be shown by part 3c of first connection 228 during pings 234 in diagram 200b of FIG. 2B. Once the connection has been forwarded, the client device may transmit, through the load balancer, a ping request for a network address or other information from the server. The client-side application library and executable operations may provide client-side operations to ping the server. At step 410, the ping request is responded to by providing the client device with a ping response having the server's network address. For example, in system 100 of FIG. 1, the selected server from server pool 136 may respond to the ping request from client device 110 with a ping response, which may be transmitted to the corresponding one of load balancers 130 connected with client device 110, and then the load balancer may then transmit that ping response to client device 110. This may be shown by part 3d of first connection 228 during pings 234 in diagram 200b of FIG. 2B. The server may respond with a network address or other information necessary for the client-side application and software library to establish a connection with the server directly. Thus, the server may provide a ping response with data necessary for the client-side application and software library to perform client-side service discovery and connection.

At step 412, the client device is connected with the server directly using the network address. For example, in system 100 of FIG. 1, client device 110 may then connect directly with the selected server from server pool 136. This may be shown by second connection 236 in diagram 200b of FIG. 2B. Client-side operations for an application and corresponding software library may use the received network address to connect directly with the server and bypass using the load balancer as an intermediary to exchange data processing requests and responses. This second direct connection may therefore allow for the client device to use the corresponding computing service via the server instance of that service being run on the server identified by the network address. At step 414, it is determined if this direct connection is successful. If not, flowchart 400 may return to step 404 and steps 404-414 may repeat with a new server, network address, and the like. However, if successful, at step 416, the connection between the load balancer and the client device is ended. For example, in system 100 of FIG. 1, the corresponding one of load balancers 130 utilized by client device 110 may end the connection with client device 110, such as by ending first connection 228 in diagram 200b of FIG. 2B. The second direct connection between the client device and the server may then be used for data processing.

Figure 5:
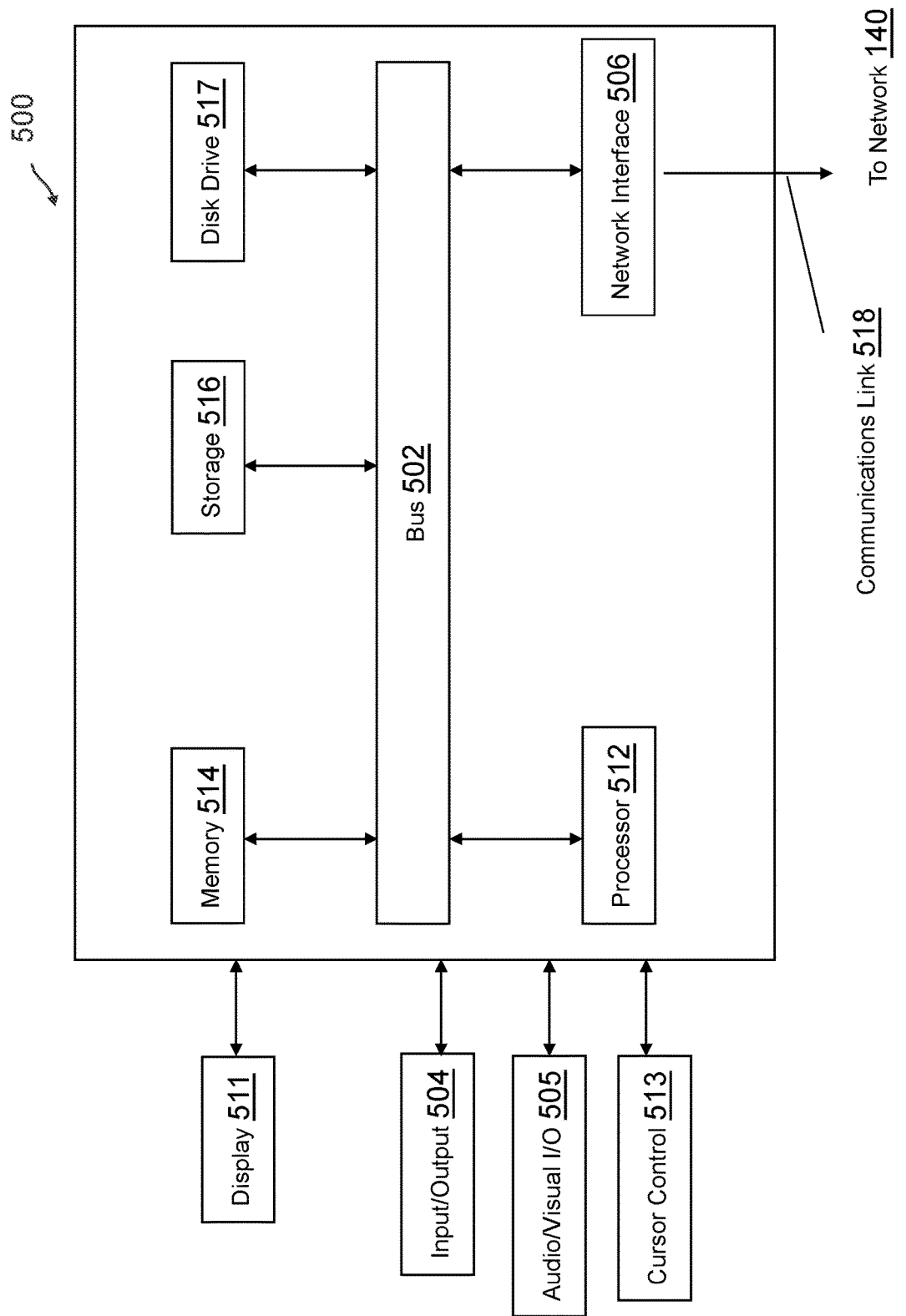
FIG. 5 is a block diagram of a computer system suitable for implementing one or more components in FIG. 1, according to various embodiments.

FIG. 5 is a block diagram of a computer system 500 suitable for implementing one or more components in FIG. 1, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows. For example, client device 110 and/or one or more of the servers, devices, or other components for service provider system 120 in FIG. 1 may be implemented by computer system 500.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 140. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a non-transitory memory; and
one or more hardware processors coupled to the non-transitory memory and configured to read instructions from the non-transitory memory to cause the system to perform operations comprising:
    establishing, by a load balancer of the system, a first connection with a client device responsive to a connection establishment request by the client device;
    determining a first server from a pool of servers for the system based on at least one of a plurality of server balancing metrics;
    forwarding, by the load balancer, the first connection to the first server, wherein the forwarding causes the client device to connect to the first server through the load balancer via the first connection;
    receiving, at the first server, a ping request from the client device via the first connection;
    providing, by the first server, a ping response to the client device, wherein the ping response comprises a first network address of the first server; and
    establishing, by the first server independent of the load balancer, a second connection with the client device using the first network address, wherein the second connection is established to handle at least one subsequent client request from the client device, wherein the second connection uses the first network address.

2. The system of claim 1, wherein the ping request and the ping response are transmitted through the load balancer between the client device and the first server prior to the establishing the second connection that communicates the at least one subsequent client request directly between the client device and the first server independent of the load balancer.

3. The system of claim 1, wherein the operations further comprise:
    closing the first connection in response to the second connection being successfully established directly between the client device and the first server.

4. The system of claim 1, wherein the operations further comprise:
    determining that the second connection is unsuccessful for communicating the at least one subsequent client request directly between the client device and the first server;
    determining, by the load balancer, a second server from the pool of servers based on the at least one of the plurality of server balancing metrics; and
    utilizing, by the load balancer, the first connection for establishing a third connection between the client device and the second server.

5. The system of claim 4, wherein the operations further comprise:
    detecting that the third connection is successfully established between the client device and the second server; and
    closing the first connection with the client device.

6. The system of claim 1, wherein the operations further comprise:
    maintaining, by the load balancer, the first connection with the client device; and
    monitoring, by the load balancer, server interaction data between the client device and the first server via the first connection.

7. The system of claim 1, wherein the at least one of the plurality of server balancing metrics utilize server availability data with at least one of a round robin technique, a consistent hashing technique, a least connection technique, a fastest response technique, or a least load technique.

8. The system of claim 1, wherein the connection establishment request comprises a service discovery request for discovery and usage of a computing service from the system, wherein the computing service is provided via the first server and comprises at least one of a risk service, a fraud detection service, a transaction processing service, a key value store service, or a computing decision service.

9. The system of claim 1, wherein the first connection comprises a persistent connection that is pre-established in a background computing thread during the connection establishment request, and wherein the persistent connection does not require an additional handshake when forwarding the first connection to the first server.

10. A method comprising:
    establishing a first connection between a load balancer and a client device when the client device connects with a service provider system over a network;

determining a first server of the service provider system that is available to handle processing of data with the client device;

connecting the client device to the first server via the first connection through the load balancer;

receiving a request from the client device for a network identifier of the first server via the first connection;

providing the network identifier to the client device via the first connection;

establishing a second connection over the network directly between the client device and the first server using the network identifier provided to the client device, wherein the second connection enables the data to be processed between the client device and the first server; and ending, by the load balancer, the first connection with the client device.

11. The method of claim 10, wherein the data is processed by the first server with the client device without packets for the data being forwarded by the load balancer to the first server.

12. The method of claim 10, wherein the first connection uses a persistent connection without requiring additional device handshakes during the connecting the client device to the first server, and wherein the determining the first server is based on a server selection operation comprising one of a round robin technique or a consistent hashing technique.

13. The method of claim 10, wherein the receiving the request is performed using a ping request by the client device and the providing the network identifier is performed using a ping response by the first server to the ping request, and wherein the ping request and the ping response and transmitted through the load balancer using the first connection.

14. The method of claim 10, wherein prior to the determining the first server, the method further comprises:

attempting to establish a third connection between the client device and a second server of the service provider system; and determining that the third connection was unsuccessful, wherein the determining the first server is responsive to the determining that the third connection was unsuccessful.

15. The method of claim 14, wherein, prior to the ending, the method further comprises:

determining that the second connection is successful for processing the data directly between the client device and the second server subsequent to the third connection being unsuccessful, wherein the first connection is ended responsive to the second connection being successful subsequent to the third connection being unsuccessful.

16. The method of claim 10, wherein the second connection comprises a secured connection that is periodically recycled with a plurality of connections, and wherein the load balancer refreshes the second connection or establish a third connection between the client device and the first server or a second server when periodically recycling the plurality of connections.

17. The method of claim 10, wherein the determining the first server is based on at least one machine learning (ML) model trained on server availability data, and wherein, prior to the determining the first server, the method further comprises:

executing the at least one ML model for a server availability prediction for a plurality of servers of the service provider system, wherein the first server is determined based on the server availability prediction.

18. A non-transitory machine-readable medium having stored thereon machine-readable instructions executable to cause a machine to perform operations comprising:

detecting, by a load balancer of a computing system, a first connection with a client device responsive to a connection establishment request by the client device;

determining a server from a pool of servers for the computing system based on a server balancing process;

connecting, via the load balancer, the client device to the server through the first connection;

receiving, at the server, a ping request from the client device via the first connection;

transmitting, by the server and in response to the ping request, a ping response to the client device, wherein the ping response comprises a network address of the server; and establishing, by the server independent of the load balancer, a second connection with the client device to handle at least one subsequent client request from the client device; and terminating the first connection.

19. The non-transitory machine-readable medium of claim 18, wherein the receiving the ping request and providing the ping response is performed through the load balancer prior to the establishing the second connection.

20. The non-transitory machine-readable medium of claim 18, wherein the server balancing process is associated with at least one of a round robin server selection operation, a consistent hashing using at least one of source IP address and a source port as a hash key, a server availability for the pool of servers including the server, server load statistics for the pool of servers, or a machine learning model for server balancing.

* * * * *